United States Patent [19]

Nohara et al.

[11] 4,074,440
[45] Feb. 21, 1978

[54] AUTOMATIC VACUUM DEHYDRATING APPARATUS IN A SLURRY CARRYING VESSEL

[75] Inventors: Tomiyasu Nohara, Takaki; Yoshiyuki Matsuno, Nagasaki; Hisamitsu Harada; Akinori Yamada, both of Kobe, all of Japan

[73] Assignees: Mitsubishi Jukogyo Kabushiki Kaisha, Tokyo; Kabushiki Kaisha Kobe Seikosho, Kobe, both of Japan

[21] Appl. No.: 689,514

[22] Filed: May 24, 1976

Related U.S. Application Data

[63] Continuation-in-part of Ser. No. 568,681, April 16, 1975, abandoned.

[30] Foreign Application Priority Data

Apr. 24, 1974 Japan ................................ 49-46810

[51] Int. Cl.$^2$ ............................................ F26B 13/30
[52] U.S. Cl. ..................................... 34/92; 159/43 R; 159/44
[58] Field of Search ................... 34/15, 92; 159/43 R, 159/44; 137/266, 392, 489.5, 544, 545

[56] References Cited

U.S. PATENT DOCUMENTS

| | | | |
|---|---|---|---|
| 2,758,061 | 8/1956 | Geller | 159/44 |
| 2,816,822 | 12/1957 | Hess et al. | 159/43 A |

FOREIGN PATENT DOCUMENTS

| | | | |
|---|---|---|---|
| 1,160,407 | 1/1964 | Germany | 159/44 |

*Primary Examiner*—John J. Camby
*Attorney, Agent, or Firm*—Cushman, Darby & Cushman

[57] ABSTRACT

An improved automatic vacuum dehydrating apparatus in a slurry carrying vessel including a hold for loading slurry therein provided with a plurality of dehydrating ports at its bottom is described herein, which comprises a dehydrating pipe branched at one end and connected to said respective dehydrating ports through respective closure valves individually provided in the respective pipe branches, a vacuum tank adapted to be evacuated and connected to the other ends of said dehydrating pipe, and pressure detector-controller means for detecting a pressure in the vicinity of each said dehydrating port and for controlling said closure valve in response to the detected pressure value. The pressure-controller means is adapted to control each said closure valve in such manner that when said detected pressure exceeds a predetermined value the closure valve in the corresponding dehydrating pipe branch may be closed, and when said detected pressure is further raised up to a preset upper limit value the same closure valve in the corresponding pipe branch may be opened again. In one preferred embodiment, said vacuum pump is in turn connected to a vacuum pump and a drainage pump, and is provided with a water level detector-controller means for detecting a level of water accumulated in said vacuum tank and for selectively controlling said drainage pump and said vacuum pump in response to the detected water level in said vacuum tank, in such manner that when the detected water level in said vacuum tank exceeds a first predetermined level said drainage pump is actuated and said vacuum pump is stopped to drain the accumulated water, whereas when the detected water level in said vacuum tank is lowered under a second predetermined level said vacuum pump is actuated and said drainage pump is stopped to evacuate said vacuum pump.

2 Claims, 5 Drawing Figures

ELETRIC POWER SOURCE

AUTOMATIC VACUUM DEHYDRATING APPARATUS IN A SLURRY CARRYING VESSEL

REFERENCE TO RELATED APPLICATION

This is a continuation in part of our earlier copending application Ser. No. 568,681, filed Apr. 16, 1975 and abandoned in favor hereof.

BACKGROUND OF THE INVENTION

This invention relates to a vessel for carrying slurry such as a mixture of pulverized iron ores and water, and more particularly, to an apparatus for automatically carrying out vacuum dehydration of slurry loaded within a hold of the vessel.

Generally, in a slurry carrying vessel, during several days soon after a departure with slurry loaded, the slurry in which compacting proceeds may be fluidified due to movement such as great rolling or vibration of a hull tending to apply an anomalous force to walls of a hold, and if no fluidity is present, compacting of the layer of slurry may often be accelerated, thus requiring excessive labor at the time of unloading.

Heretofore, in order to avoid these phenomena, it has been proposed to forcibly dehydrate the layer of slurry by means of a vacuum pump. However, this procedure involves problems such that if the dehydration is merely continued by means of the vacuum pump, there is a tendency to suck air present in the upper portion within the hold through cracks formed in the layer of locally compacted and solidified pulverized iron ores, and as a result, efficient dehydration cannot always be accomplished as a whole.

The present invention overcomes the disadvantages as noted above, and has it as an object to provide an apparatus wherein highly efficient vacuum dehydration may be automatically accomplished while controlling compacting of every portion of slurry loaded in a slurry carrying vessel.

One feature of the present invention is to provide an automatic vacuum dehydrating apparatus in a slurry carrying vessel which includes a hold for loading slurry therein provided with a plurality of dehydrating ports at its bottom, comprising a dehydrating pipe branched at one end and connected to said respective dehydrating ports through respective closure valves individually provided in the respective pipe branches, a vacuum tank adapted to be evacuated and connected to the other ends of said dehydrating pipes, pressure detector-controller means for detecting a pressure in the vicinity of each said dehydrating port and for controlling said closure valve in response to the detected pressure value, in such manner that when said detected pressure exceeds a predetermined value the closure valve in the corresponding dehydrating pipe branch may be closed.

Another feature of the present invention is to provide the above-featured automatic vacuum dehydrating apparatus in a slurry carrying vessel, in which said pressure detector-controller means is also adapted to control said closure valve in response to the detected pressure value, in such manner that when said detected pressure is further raised up to a preset upper limit value, the same closure valve in the corresponding dehydrating pipe branch may be opened again.

Still another feature of the present invention is to provide the above-featured automatic vacuum dehydrating apparatus in a slurry carrying vessel, in which said vacuum tank is in turn connected to a vacuum pump and a drainage pump, and is provided with a water level detector-controller means for detecting a level of water accumulated in said vacuum tank and for selectively controlling said drainage pump and said vacuum pump in response to the detected water level in said vacuum tank, in such manner that when the detected water level in said vacuum tank exceeds a first predetermined level said drainage pump is actuated and said vacuum pump is stopped to drain the accumulated water, whereas when the detected water level in said vacuum tank is lowered under a second predetermined level said vacuum pump is actuated and said drainage pump is stopped to evacuate said vacuum tank.

Yet another feature of the present invention is to provide the above-featured automatic vacuum dehydrating apparatus in a slurry carrying vessel, in which said vacuum tank is connected to a vacuum pump via a first additional closure valve at its upper wall portion, to a drainage pump via a second additional closure valve at its lower wall portion, to the atmosphere via a third additional closure valve at its upper wall portion, and to said dehydrating pipe via a fourth additional closure valve, and in which said water level detector-controller means responds to the detected water level in said vacuum tank for selectively controlling said drainage pump, said vacuum pump and said first, second, third and fourth additional closure valves, in such manner that when the detected water level in said vacuum tank exceeds a first predetermined level, said drainage pump is actuated and said vacuum pump is stopped, while closing said first and fourth additional closure valves and opening said second and third additional closure valves, whereas when the detected water level in said vacuum tank is lowered under a second predetermined level, said vacuum pump is actuated and said drainage pump is stopped, while opening said first and fourth additional valves and closing said second and third additional closure valves.

In accordance with the automatic vacuum dehydrating apparatus of the present invention, the closure valve in each dehydrating pipe may be continuously controlled in a proper manner while detecting suction pressure by means of a pressure detector-controller unit, with respect to each of the dehydrating ports formed at the bottom of the hold, so that the stoppage of vacuum hydration caused by suction of air may be eliminated, and in addition, when the water accumulated within the vacuum tank by the dehydrating operation exceeds a predetermined level, a water level detector-controller unit which detects the water level, achieves automatic control so as to stop the vacuum pump and to actuate the drainage pump. In this manner, the vacuum dehydration of the slurry as a whole, may be automatically and efficiently accomplished.

These and other objects, features and advantages of the present invention will become more apparent by reference to the following description taken in conjunction with the accompanying drawing, in which the single figure is a schematic diagram illustrating an arrangement and connections of principal component parts of an automatic vacuum dehydrating apparatus in a slurry carrying vessel according to one preferred embodiment of the present invention.

DETAILED DESCRIPTION OF PRESENTLY PREFERRED EMBODIMENT

Figure 1:
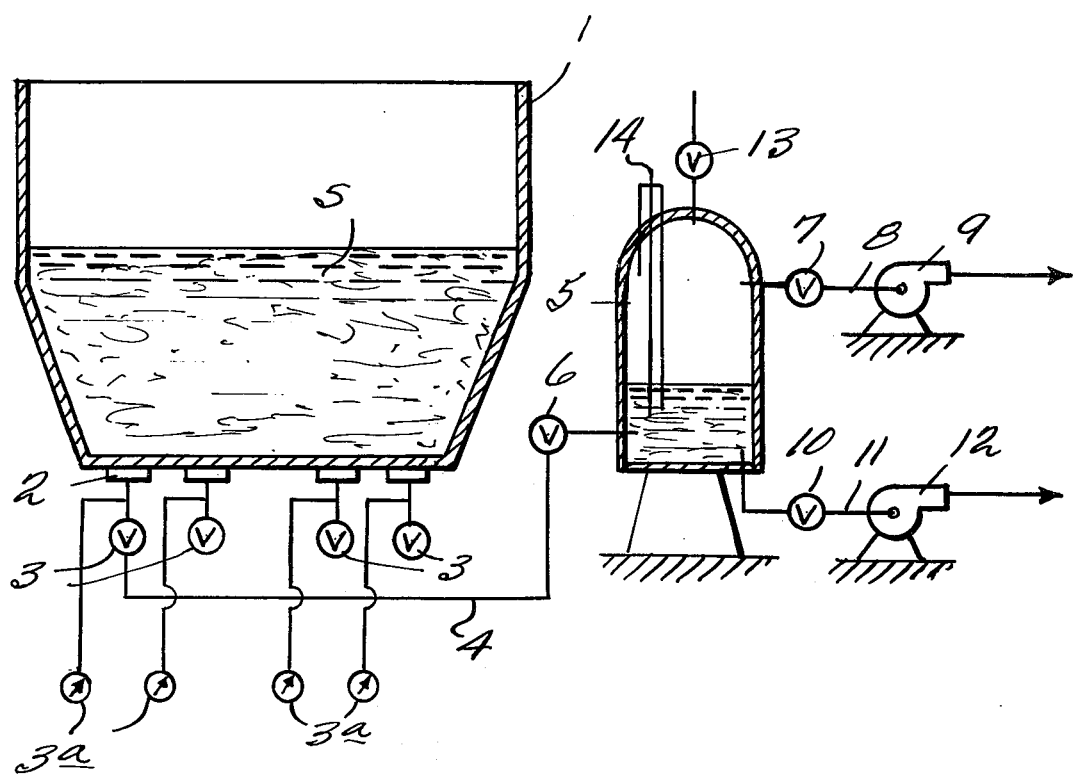
FIG. 1 is a schematic view of a slurry carrying vessel provided with an automatic vacuum dehydrating system in accordance with the present invention.

Referring first to FIG. 1, the hold 1 of the slurry carrying vessel has a plurality of dehydrating ports formed at its bottom.

A vacuum tank 5 is connected to each of the dehydrating ports 2 via a dehydrating pipe 4 and one of its branches through a closure valve 3 such as an electromagnetic valve. A main closure valve 6 which also consists of an electromagnetic valve is interposed in the connecting portion of the dehydrating pipe 4 to the vacuum pump 5.

A pressure detector-controller unit 3a adapted to detect suction pressure in the vicinity of each of the dehydrating ports 2 is provided to control the closure valve 3 in each manner that when the thus detected pressure exceeds a predetermined value, a signal is sent to the corresponding closure valve 3 to close the same.

To an upper wall portion of the vacuum tank 5 is connected a vacuum pump 9 through a vacuum valve 7 consisting of an electromagnetic valve and a suction pipe 8, while to a lower wall portion of the vacuum tank 5 is connected a drainage pump 12 through a drain valve 10 consisting of an electromagnetic valve and a drain pipe 11.

In addition, to the top of the vacuum tank 5 is connected an air breather pipe communicating with the atmosphere through an air valve 13 which also consists of an electromagnetic valve. In the interior of the vacuum tank 5 is provided a water level detector-controller unit 14 so designed that when a level of water accumulated in the vacuum tank 5 exceeds predetermined level, the water level detector-controller unit 14 detects such a level and sends signals to the valves 6, 7, 10 and 11 and the pumps 9 and 12 so as to close the main closure valve 6 and the vacuum valve 7 and open the drain valve 10 and the air valve 13 and at the same time to stop the vacuum pump 9 and actuate the drainage pump 12.

When the water level in the vacuum tank 5 is lowered under another predetermined level, the water level detector-controller unit 14 again sends signals to the valves 6, 7, 10 and 11 and the pumps 9 and 12 so as to open the main closure valve 6 and the vacuum valve 7 and close the drain valve 10 and the air valve 13 and at the same time to stop the drainage pump 12 and actuate the vacuum pump 9.

Since the automatic vacuum dehydrating apparatus in a slurry carrying vessel according to the present invention is constructed as described above, after a cargo S in the form of slurry has been loaded within the hold 1, if the vacuum pump 9 is actuated while opening the closure valves 3 for the respective dehydrating ports 2, the main closure valve 6 and the vacuum valve 7, then the water in the cargo S can be sucked and accumulated in the vacuum tank 5.

As the compacting of the slurry form of cargo S proceeds, it may possibly happen that only a part of the slurry layer of the cargo S corresponding to a certain dehydrating port 2 is locally promoted in compacting and thereby cracks extending from the dehydrating port 2 up to the upper surface of the cargo S are formed in that compacted part. Even if such cracks should be formed, a pressure detector-controller unit 3a provided for detecting the suction pressure in the vicinity of that dehydrating port 2 detects an increase of the pressure exceeding a predetermined value caused by the air breath from the atmosphere through the cracks to the dehydrating port 2 and thus sends a signal to the closure valve 3 in the corresponding branch of the dehydrating pipe 4 to automatically close the same valve 3. Therefore, the increase of the pressure in the dehydrating port 2 to which the cracks communicate, would not adversely affect upon the dehydrating action through the remaining dehydrating ports 2, and thereby highly efficient vacuum dehydration of the slurry can be achieved continuously.

While the aforementioned state, where only a certain closure valve 3 is closed, is maintained, the pressure at the corresponding dehydrating port 2 tends to further rise up to the pressure caused hy the weight of the slurrly layer because of the fact that the above-described cracks in the compacted part of the slurry layer of the cargo S are blocked during the rolling and vibration of the hull. In this case, however, it is only necessary to preset an upper limit value for the pressure in the dehydrating port 2 in the pressure detector-controller unit 3a so that when the detected pressure is further raised up to the upper limit value, the previously closed closure valve in the corresponding dehydrating pipe branch may be opened again.

Figure 2:
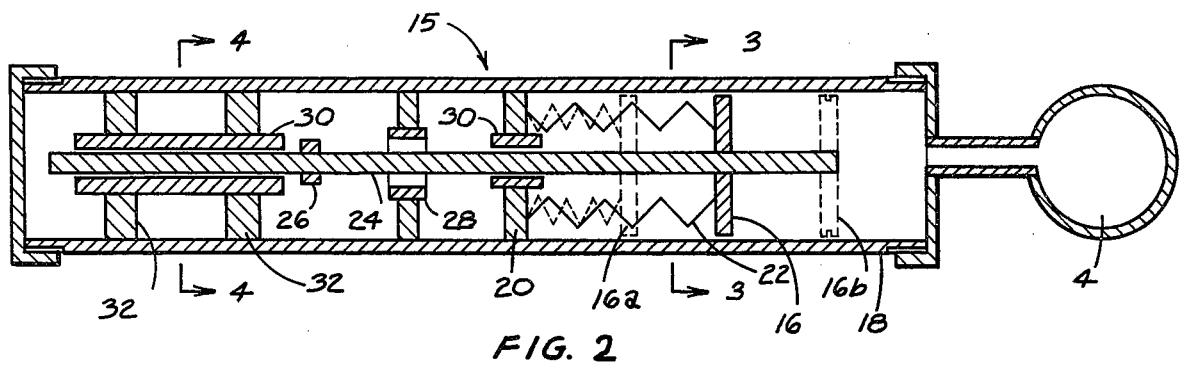
FIG. 2 is a schematic view of an exemplary pressure sensing valve operator for use in the system of FIG. 1.
Figure 4:
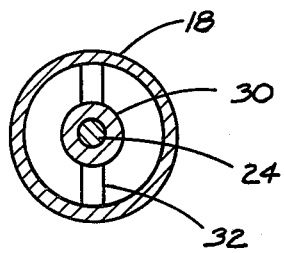
FIG. 4 is a transverse sectional view taken on line 4—4 of FIG. 2.
Figure 3:
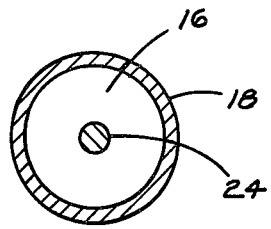
FIG. 3 is a transverse sectional view taken on line 3—3 of FIG. 2.
Figure 5:
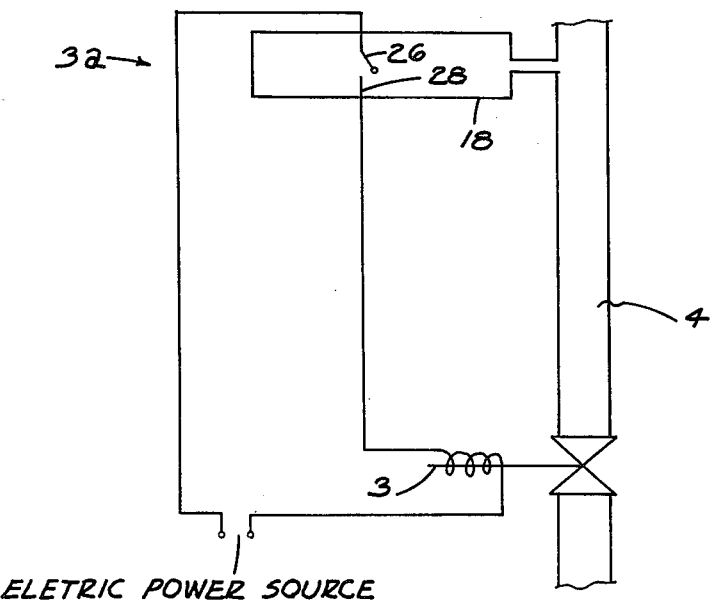
FIG. 5 is a schematic view of the solonoid valve operating circuit.

Referring now to FIG. 2, a exemplary pressure sensing valve operator sub-system for use with each electromagnetic closure valve 3 is shown at 15. The operator 15 includes a disk 16 which is slidable along inside a cylinder 18 and which is secured to a partition 20 in the cylinder 18 by a spring 22. To the disc 16 is mounted a circular rod 24 so as to be axially movable in accordance with the movement of the disc 16. The rod 24 is mounted in bearings 30 that are supported on the cylinder by bearing supports 32 and partition 20. On this circular rod 24 is fixedly mounted a ring 26 made of highly conductive material. In addition, a conductor 28 is disposed within the cylinder 18 so as to be able to contact with this ring 26. The ring 26 and conductor 28 form a part of the energizing circuit for the electromagnetic valve 3.

On one side of the disc 16 is exerted the inner pressure within the dehydrating pipe 4, so that the equilibrium position of the disc 16 may be determined by the equilibrium between the force exerted on one side of the disc by the inner pressure and the force exerted on the other side of the disc by the spring 22. In the illustrated example, when the pressure in the dehydrating port is the atmospheric pressure, the disc 16 takes the position depicted in solid line, whereas if the pressure has a selected certain value higher than the atmospheric pressure, then the disc 10 takes a position depicted at 16a by a broken line, and if the pressure has a selected certain value lower than the atmospheric pressure, then the disc 16 takes a position similarly depicted at 16b by a broken line. Provision is made such that when the disc 16 takes the position 16b, the positions of the ring 26 and the conductor 28 may coincide with each other. If the above-mentioned provision is made, an electric current is passed through an electromagnetic valve when the pressure in the dehydrating port is equal to the atmospheric pressure, while the current is not passed through the electromagnetic valve 3 in the other cases. Accordingly, if the electromagnetic valve has such structure that it is closed only when a current is passed therethrough, then in either case that the pressure in the dehydrating port is larger or smaller than the atmospheric pressure, the electromagnetic valve is kept opened and thereby the dehydrating operation can be carried out.

In addition, in case that it has been observed by measuring the degree of sink of the slurry surface and/or by visual monitoring that fluidifying phenomena are occurring locally in the vicinity of a certain dehydrating port 2, the closure valves 3 for the remaining dehydrating ports 2 can be closed manually so that dehydration may be achieved mainly through the dehydrating port 2 near to the fluidified portion.

When the level of the water accumulated in the vacuum tank 5 through vacuum dehydration from the cargo S exceeds a predetermined level, in response to signals emitted from the water level detector-controller unit 14 which detects the excess water level, the main closure valve 6 and the vacuum valve 7 are closed while the air valve 13 and the drain valve 10 are opened, and at the same time the vacuum pump 9 is stopped and the drainage pump 12 is actuated, so that the water accumulated within the vacuum tank 5 can be automatically drained outside of the vessel.

Subsequently, when the water level within the vacuum tank 5 has been lowered under another predetermined level, in response to signals emitted from the water level detector-collector unit 14 which has detected the lowered water level, the main closure valve 6 and the vacuum valve 7 are opened while the air valve 13 and the drain valve 10 are closed, and at the same time the drainage pump 12 is stopped and the vacuum pump 9 is actuated so that the vacuum tank 5 can be evacuated while communicating with the respective dehydrating ports 2 and thereby can accomplish dehydration from the slurry form of cargo S in the hold 1.

It is to be noted by displaying on a counter the number of drainage operations from the vacuum tank 5 by means of the drainage pump 12, the total amount of water extracted from the slurry can be obtained.

Now the effects and advantages possessed by the automatic dehydrating apparatus in a slurry carrying vessel according to the present invention can be enumerated as follows:

(1) An automatic control for the vacuum dehydration of the slurry form of cargo S within the hold can be achieved so that the compacting of the slurry may be accomplished in an adequate manner as the vacuum dehydration proceeds, and also fluidified phenomena of the slurry form of cargo S can be prevented.

(2) It becomes possible to partly vacuum dehydrate the slurry within the hold, and accordingly, unevenness of the dehydration effect within the slurry layer can be eliminated.

(3) It is possible to avoid dehydration from an unnecessary portion of the slurry form of cargo S and thereby save the driving power of the apparatus.

(4) Since an automatic operation can be accomplished as a whole, it is possible to achieve control for the compacting of the slurry in a highly efficient and quick manner.

(5) As a result of the aforementioned various effects, an advantage is obtained in that the required labor and working time can be greatly reduced.

What is claimed is:

1. In combination with a slurry carrying vessel having a hold for slurry, the hold having a bottom, an automatic dehydrating system, comprising:

means defining a plurality of ports in the hold bottom;

a vacuum tank and means for drawing a vacuum in the tank;

dehydrating pipe means connected between the tank and each port and including a branch line for each port;

an automatically openable automatically closable valve interposed in each branch line so that each port is communicated through the respective branch line to the vacuum tank only when the respective valve is open;

a pressure sensing valve controller interposed in each branch line upstream of said valve therein, each controller including means for sensing the pressure in the hold near the respective port;

each controller being operatively connected to the respective valve for opening and closing that valve;

each controller sensing means including means for sensing whether the pressure in the hold near the respective port is close to atmospheric pressure, within a selected range having one limit below atmospheric pressure and another limit above atmospheric pressure, for closing the respective valve only if the sensed pressure lies within this range and for opening the respective valve if the sensed pressure is not within said range.

2. The slurry vessel hold automatic dehydrating system of claim 1, wherein:

each said valve is an electromagnetic valve; and each pressure sensing valve controller sensing means includes a pressure responsive piston element exposed on one side to the pressure being sensed and having an electrical contact mounted thereon for movement therewith in reaction to the pressure being sensed;

each controller sensing means further including at least one stationary electrical contact stationed to bear one relation of contact and non-contact with said contact on the piston element when said pressure being sensed lies within said range and to bear the opposite relation of contact and non-contact with said contact on the piston element when said pressure being sensed lies outside said range; and electric circuit leads including an electric power source connecting the respective contacts with the respective valves whereby the respective controllers operate the respective valves.

* * * * *